United States Patent [19]
Mathiasson et al.

[11] Patent Number: 5,925,287
[45] Date of Patent: *Jul. 20, 1999

[54] FLUORESCING COVERING FOR ROADS, PARKING AREAS, ETC. WHICH FLUORESCES ON ILLUMINATION WITH ULTRA-VIOLET LIGHT

[75] Inventors: Anders Mathiasson, Henån; Ingemar Jacobsson, Lund; Toni Ogemark, Kristianstad, all of Sweden

[73] Assignee: Cleanosol AB, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/902,205

[22] Filed: Jul. 29, 1997

Related U.S. Application Data

[63] Continuation of application No. 08/644,986, May 9, 1996., abandoned

[30] Foreign Application Priority Data

May 11, 1995 [SE] Sweden .................................. 9501733

[51] Int. Cl.$^6$ ........................... C09K 11/08; C09K 11/54; C09K 11/06; E01F 9/04
[52] U.S. Cl. ............................... 252/301.36; 252/301.36; 427/137; 106/31.04
[58] Field of Search ...................... 427/137; 252/301.36, 252/301.35; 106/31.04

[56] References Cited

U.S. PATENT DOCUMENTS

| | | | |
|---|---|---|---|
| 3,105,954 | 10/1963 | Gill, Jr. | ................................ 252/301.36 |
| 3,253,146 | 5/1966 | De Vries | ................................. 427/137 |
| 5,213,711 | 5/1993 | Fast et al. | ........................... 252/301.36 |

FOREIGN PATENT DOCUMENTS

| | | |
|---|---|---|
| 1561530 | 2/1980 | United Kingdom . |
| 2279360 | 1/1995 | United Kingdom . |

OTHER PUBLICATIONS

Barnett et al, "The Emission Characteristics of Fluorescent Pigments", Jour. Opt. Soc. Amer., vol. 39, No. 8, pp. 663–669, Aug. 1949.

*Primary Examiner*—Melissa Koslow
*Attorney, Agent, or Firm*—Lerner, David, Littenberg, Krumholz & Mentlik, LLP

[57] ABSTRACT

The invention relates to a fluorescing covering for roads, parking places, etc. which fluoresces when being illuminated with ultraviolet light. In addition to the fluorescing agent, the covering comprises a colouring pigment or a soluble colorant which filtrates the fluorescing light and dissipates only light having a desired wavelength. This colouring pigment or colorant also reflects light having a desired wavelength and absorbs light having a non-desired wavelength also from daylight or some other conventional light source.

5 Claims, No Drawings

FLUORESCING COVERING FOR ROADS, PARKING AREAS, ETC. WHICH FLUORESCES ON ILLUMINATION WITH ULTRA-VIOLET LIGHT

This is a continuation of application Ser. No. 08/644,986, filed May 9, 1996, now abandoned.

TECHNICAL FIELD

The present invention relates to a fluorescing covering for roads, parking places, etc. which fluoresces on illumination with ultraviolet light and the invention relates to a covering which emits light with a desired and chosen colour.

PRIOR ART

Fluorescing coverings for said purposes are known earlier. Besides marking of roads, they are also used as coverings on refuges and on signposts and signs of different kinds. One example of such coverings appears in the U.S. Pat. No. 3,253,146, which describes a road marking which is composed of glass, pigment and binders. The marking fluoresces when being illuminated with UVA light. The binder is transparent and comprises naturally occurring resins and glycerol esters. Also synthetic resins can be used, such as glycerolstearate, formalin resins, etc..

The Swedish patent 426 109 also describes a fluorescing road covering which has been made fluorescing by doping a mineral included in the covering with an agent which gives the mineral fluorescing properties. An example of such agents is fluor-spar ($CaF_2$) which may have been made fluorescing by being doped with manganese (in). The binder is said to be tar.

GB-patent 2 043 673 also describes a fluorescing composition comprising luminescing uranates or organic material. This material is carried preferably by silica or an aluminium silicate the surface of which has been made porous or rough by etching and which has a high hardness. The binder is a mixture of a styrene or diisocynanate resin. The binder is transparent.

The German patent DE 3 321 738 describes a similar composition for the production of reflex elements for road markings, signs and sporting articles. The mixture comprises pigments of organic optical whiteners and the binder consists of a glass-clear transparent material of different polymers.

TECHNICAL PROBLEM

The above mentioned coverings emit light with the colour which the fluorescent light gives. This is, in most cases, white or blue-white having a wavelength within the range of 400 to 500 nm. Also other wavelengths may occur on the fluorescing light and this will then assume another colour. It is however desirable that it should be possible to choose between different colours on the reflected light, for example yellow which is used for road markings in many countries. With regard to the road coverings according to the prior art, it will then be necessary to make the fluorescing agent create a visible light having a yellow colour. However, it is not certain that this covering will be yellow in normal daylight which is reflected. In some special cases other colours than white and yellow are also used, for example for marking pedestrian crossings, bicycle lanes and different types of symbols and logotypes.

SOLUTION

The purpose of the present invention has therefore been to bring about a marking covering which emits light with the desired colour on irradiation with ultraviolet light and also on being irradiated by daylight. Therefore, a fluorescing covering for roads, parking places, etc. has been brought about, which covering fluoresces when irradiated with ultra-violet light and which is characterised in that it comprises a fluorescing pigment or agent and a colour pigment or a soluble colouring agent which filtrates the fluorescing light so that only light within the desired wavelength area leaves the covering, whereby wavelengths outside the desired wavelength area are absorbed.

According to the invention, it is suitable that the fluorescing pigment or the agent fluoresces strongly within the desired wavelength area.

According to the invention, it is desirable that also visible light within the desired wavelength area within is which the covering shall emit light is refracted whereas wavelengths outwith the desired wavelength area are absorbed.

DETAILED DESCRIPTION

The covering itself and the binder therein may, according to the invention, consist of substantially known coverings and binders. Such a binder and covering are described in, for example, the Swedish patent 9303750-5. The binder in this case consists of a solid solution of an amorphous polymer composition and comprises suitably about 15 parts by weight of hydrocarbon resins, about 5 parts by weight of low molecular hydrocarbons, about 3 parts by weight of block copolymers and about 2 parts by weight of polyolefine copolymers.

However, the binder shall only make up a part of the covering. Other agents in the covering are reinforcing and friction materials, glass beads and above all fluorescing agents.

The reinforcing and friction materials may be present in the form of mineral powder having a grain size of between 0,001 mm and 1 mm. Examples of such agents are chalk, dolomite, silicate and quartz sand, for example Myanit and Mikrodol from Omya AB, Luxovit from Superfoss Construction A/S and sand form Hálabäcksand.

The spherical glass beads which are included in the covering shall contribute to reflection on irradiation with visible light in darkness. Such reflecting beads are non-coloured spherical glass beads having a refraction index of at least 1.5 and a roundness percent of at least 80% and a grain size of between 0.1 mm and 2.0 mm. Such glass beads may be obtained from Potter's United Beads and Swarco.

The base material in the covering may, however, consist of other known base materials for coverings than those exemplified above.

The above mentioned coverings and most other known coverings fluoresce with a white to yellow-white light. Other fluorescing agents which give another colour may also be used. If, however, a fluorescing covering which emits light with a desired colour and which emits light with the same colour both in daylight with light from conventional headlights on cars and with UV light is wanted then, according to the present invention, all other wavelengths within the visible light than those wavelengths which are desired can be filtered out. According to the invention, therefore, an absorption agent for such not-desired wavelengths of light is added, but which lets through and reflects visible light having the desired wavelength, namely a pigment or a dissolved colorant which gives this effect. This colorant can, for example, be yellow and the covering will then emit light with a yellow colour both in daylight and when being irradiated with UVA light. A condition for sufficiently strong yellow light to be emitted on irradiation with UVA light outside the visible area is, however, that the fluorescing agent fluoresces with the main intensity within the desired wavelength area.

UVA light has a wavelength of 320 to 400 nm. The visible light to which it is desired that the UVA rays shall be changed, in this case yellow, has a wavelength of 600 to 670 nm. A fluorescing agent having a maximum within this area is for example zinc white, which gives a yellow white fluorescence. By adding a yellow colorant a bright yellow appearance within the area of 600 to 670 nm will therefore be obtained. An example of such a yellow colorant is a diazo pigment which is marketed under the trade name Irgalith Gelb LBIW by Ciba Geigy.

Besides zinc white, organic fluorescing agents which are suitable for bringing about a yellow colour by means of the above mentioned colorant can be used. Examples of such organic fluorescing products are Saturn Yellow from Dayglo Color Corporation and Lemon Yellow from Sinloihi.

An example of a covering according to the invention, which is in no way intended to limit the invention, his the following composition:

| | | |
|---|---|---|
| Resins | 11 weight parts | |
| Elastomers | 2 weight parts | |
| Polymers | 3 weight parts | |
| Softeners | 3 weight parts | |
| Yellow colorant | 1 weight parts | |
| Zinc white | 12 weight parts | |
| Dolomite | 23 weight parts | |
| Sand | 18 weight parts | |
| Glass beads | 20 weight parts | |
| Crushed marble | 7 weight parts | |

The fluorescing agent is accordingly zinc white and a yellow colorant has been added thereto. Dolomite, sand and crushed marble are reinforcing and friction materials.

The invention is not limited to the above described embodiment example but can be varied in different ways within the scope of the claims.

We claim:

1. A fluorescing covering for road markings, that emits light in a desired wavelength area upon irradiation with ultraviolet light, comprising:

a binder;

a fluorescing pigment that fluoresces light which contains wavelengths in a least two color portions of the visible spectrum and a main intensity in the desired wavelength area upon irradiation with ultraviolet light, wherein said fluorescing pigment is mixed directly with said binder; and a coloring pigment for filtering fluoresced light other than light within the desired wavelength area from said fluorescing pigment, wherein said coloring pigment is mixed directly with said binder;

whereby fluoresced light from inside the desired wavelength area is emitted from the covering and fluoresced light from outside the desired wavelength is absorbed.

2. The fluorescing covering of claim 1, wherein said fluorescing pigment is zinc white.

3. The fluorescing covering of claim 1, wherein the fluorescing pigment is an organic fluorescing agent.

4. The fluorescing covering of claim 1, further comprising glass reflecting beads mixed with said binder.

5. A method of making a fluorescing covering for road markings which emits light with a desired color upon irradiation with ultraviolet light comprising the steps of:

selecting a fluorescing pigment which fluoresces in at least a portion of the spectrum of visible light and having a main intensity in a desired wavelength area upon irradiation with ultraviolet light;

selecting a coloring pigment that coordinates with said fluorescing pigment and which absorbs light in the visible spectrum other than in said desired wavelength area of said fluorescing pigment; and mixing an effective amount of said fluorescing pigment and an effective amount of said coloring pigment with an effective amount of a binder so as to produce a fluorescing covering wherein fluoresced light from inside said desired wavelength area is emitted from the covering and fluoresced light from outside said desired wavelength is absorbed.

* * * * *

UNITED STATES PATENT AND TRADEMARK OFFICE
CERTIFICATE OF CORRECTION

PATENT NO. : 5,925,287
DATED : July 20, 1999
INVENTOR(S) : Mathiasson et al.

It is certified that error appears in the above-identified patent and that said Letters Patent is hereby corrected as shown below:

Column 1, line 31, "(in)" should read --(Mn)--.

Column 2, line 15, delete "is".

Column 3, line 20 "his" should read --has--.

Column 4, line 3, "a" should read --at--.

Signed and Sealed this

Twenty-eighth Day of December, 1999

Attest:

Q. TODD DICKINSON

*Attesting Officer*  *Acting Commissioner of Patents and Trademarks*